United States Patent
Uda et al.

(10) Patent No.: US 8,742,257 B2
(45) Date of Patent: Jun. 3, 2014

(54) TERMINAL FIXING DEVICE FOR CONTROL CABLE

(75) Inventors: Takashi Uda, Hiroshima (JP); Satoshi Yoshihara, Hiroshima (JP); Shigeharu Yokoyama, Hiroshima (JP)

(73) Assignees: U-Shin Ltd., Tokyo (JP); Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/450,802

(22) Filed: Apr. 19, 2012

(65) Prior Publication Data

US 2012/0267167 A1 Oct. 25, 2012

(30) Foreign Application Priority Data

Apr. 21, 2011 (JP) ................................. 2011-095175

(51) Int. Cl.
*H02G 15/02* (2006.01)

(52) U.S. Cl.
USPC .................... 174/50.56; 174/74 R; 74/502.4

(58) Field of Classification Search
USPC ........... 174/74 A, 153 G, 153 R, 502.4, 74 R, 174/50.56; 403/122; 248/56; 74/502.4, 74/502.2

See application file for complete search history.

(56) References Cited

U.S. PATENT DOCUMENTS

| 7,422,181 B2 * | 9/2008 | Sβenbach ........................ 248/56 |
| 2009/0120231 A1 * | 5/2009 | Ruhlander et al. ........... 74/502.4 |

FOREIGN PATENT DOCUMENTS

| FR | 2644532 A1 * | 9/1990 | .............. F16C 1/265 |
| JP | S60107615 | * 7/1985 | .............. F16C 1/265 |
| JP | 1-42647 | 12/1989 | |

* cited by examiner

*Primary Examiner* — Ishwarbhai B. Patel
*Assistant Examiner* — Paresh Paghadal
(74) *Attorney, Agent, or Firm* — Wenderoth, Lind & Ponack, L.L.P.

(57) ABSTRACT

A cable cap of a control cable has a small-diameter portion and a large-diameter portion on an outer tube side, and a large-diameter portion on a tip side. A bracket includes a cutout groove, into which the small-diameter portion of the cable cap can be inserted from above, an engaging projection that is formed in such a manner as to project from an inner wall of the cutout groove toward another inner wall opposite to the inner wall, and an engaging recess to be engaged with an edge portion of an outer peripheral surface of the large-diameter portion on the outer tube side in a state in which the outer tube side of the control cable is inclined around the small-diameter portion as a fulcrum engaged with the engaging projection by operating force from the outside.

3 Claims, 6 Drawing Sheets

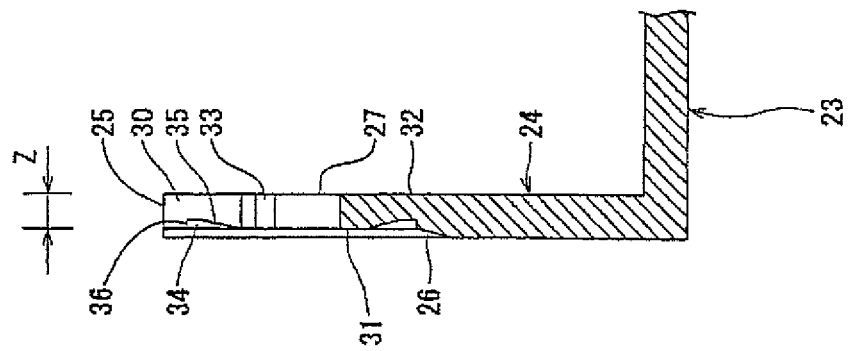
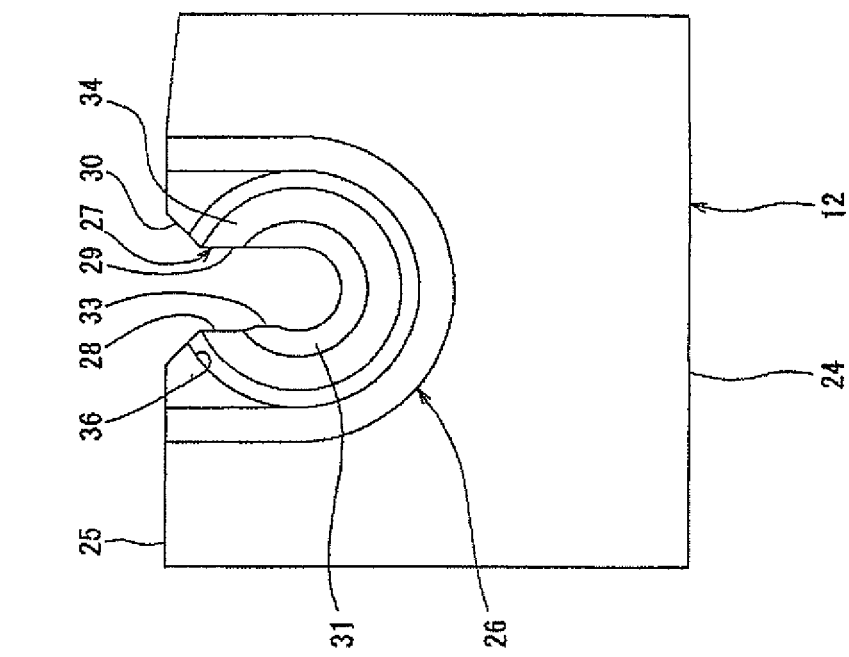

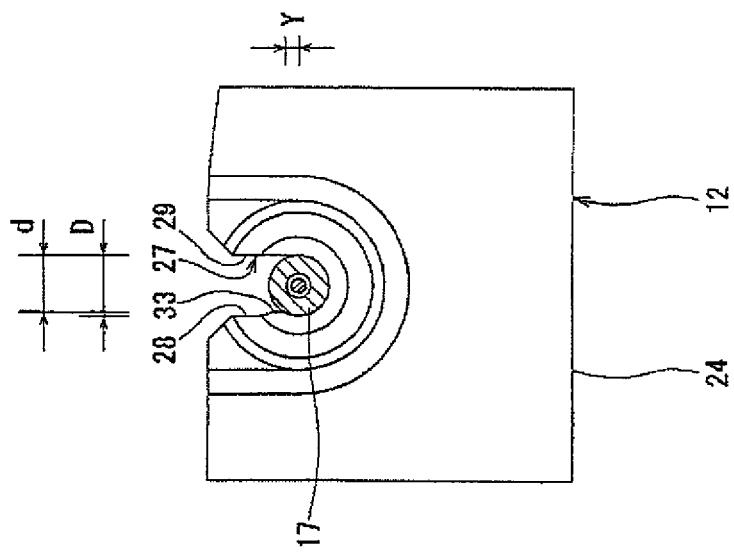
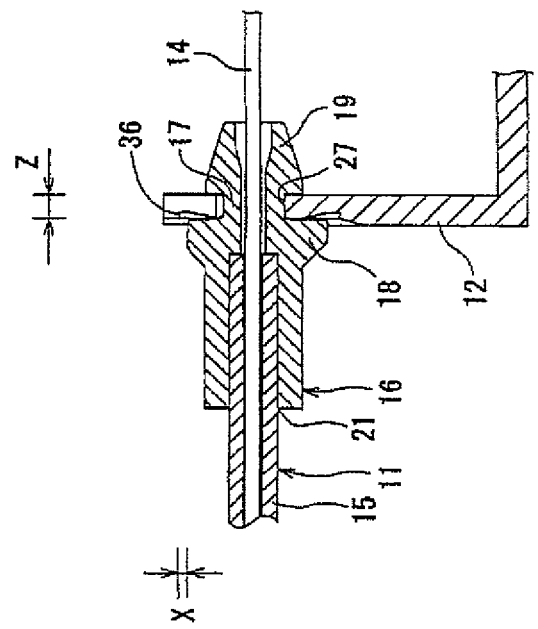

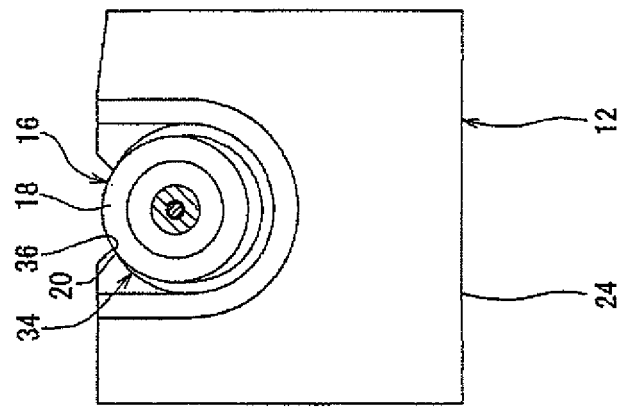
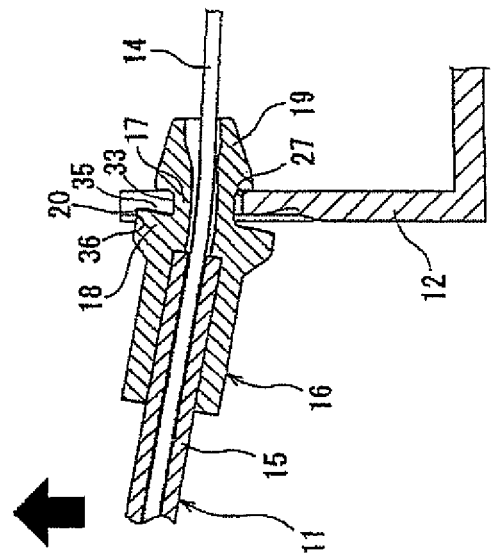

TERMINAL FIXING DEVICE FOR CONTROL CABLE

BACKGROUND OF THE INVENTION

1. Field of the Invention

The present invention relates to a terminal fixing device for a control cable and, more particularly, to a terminal fixing device for a control cable, in which a terminal of an outer tube having an inner cable slidably inserted thereinto is fixed to a bracket serving as a fixing member.

2. Description of the Related Art

JP 01-042647 Y B discloses a terminal device for a control cable, in which a small-diameter portion of an outer casing (i.e., an outer tube) is inserted into a U-shaped cutout groove formed at a fixing plate (i.e., a bracket. A large-diameter portion of the outer casing is urged by a spring member in such a manner as to be fitted to a recess formed at the fixing plate, thus inhibiting the outer casing from disengaging from the cutout groove so as to securely fix the outer casing to the fixing plate.

However, since the above-described device requires a dedicated spring member, the number of component parts is large, thus increasing the cost, and further, requiring a complicated work for incorporating the spring member.

SUMMARY OF THE INVENTION

Therefore, an object of the present invention is to provide a terminal fixing device for a control cable which can be inhibited from disengaging from a bracket with a simple configuration without any increase in cost.

As means for solving the above-described problem, a terminal fixing device for a control cable according to the present invention includes:
 a control cable including
  an inner cable to be connected to an operating member or a member to be operated,
  an outer tube, into which the inner cable is slidably inserted, and
  an elastically deformable cable cap fixed to an end of the outer tube, the cable cap having a small-diameter portion and a large-diameter portion on an outer tube side and a large-diameter portion on a tip side which are adjacent to the small-diameter portion on both sides in an axial direction; and
 a bracket including
  a bottomed cutout groove, into which the small-diameter portion of the cable cap can be inserted from above,
  an engaging projection that is formed in such a manner as to project from an inner wall of the cutout groove toward another inner wall opposite to the former inner wall and is engaged with an upper portion of the small-diameter portion of the cable cap at an abutment position where a lower portion of the small-diameter portion of the cable cap abuts against a bottom of the cutout groove, and
  an engaging recess to be engaged with an edge portion of an outer peripheral surface of the large-diameter portion on the outer tube side in a state in which the outer tube side of the control cable is inclined around the small-diameter portion as a fulcrum engaged with the engaging projection by operating force from the outside.

With this configuration, since the cable cap can be elastically deformed, the small-diameter portion of the cable cap can be inserted into and pushed in the cutout groove formed at the bracket from above so as to pass between the engaging projection and the inner wall facing the engaging projection.

Moreover, the pushed-in cable cap can be contained in the cutout groove in the state in which the upper portion of the small-diameter portion is engaged with the engaging projection of the bracket at the abutment position at which the lower portion of the small-diameter portion of the cable cap abuts against the bottom of the cutout groove. Consequently, the cable cap can be fixed to the bracket in the state in which the control cable can be inhibited from being drawn from the cutout groove. In this state, when the control cable is pulled in a withdrawal direction from the cutout groove by the operating force from the outside, the control cable is inclined around the small-diameter portion as a fulcrum in such a manner that its outer tube side is located above the small-diameter portion. At this time, the cable cap is elastically deformed in such a manner that the upper portion of the large-diameter portion on the outer tube side is brought into press-contact with the bracket, and further, the lower portion is separated from the bracket. Since the engaging recess is formed at the bracket, the edge portion of the outer peripheral surface of the large-diameter portion on the outer tube side can be engaged with the engaging recess before the small-diameter portion of the cable cap passes upward between the engaging projection and the inner wall facing the engaging projection. Consequently, in the case where the control cable is pulled in the withdrawal direction from the cutout groove by the operating force from the outside, the control cable can be inhibited from being drawn from the cutout groove. The cable cap connected to the terminal of the outer tube can be securely fixed to the bracket with a simple configuration without additionally disposing a dedicated fixing component part.

It is preferable that the axial length of the cutout groove should be slightly less than the length of the small-diameter portion of the cable cap in the axial direction in such a manner that the large-diameter portion on the outer tube side and the large-diameter portion on the tip side abut against the bracket substantially tightly in the axial direction in the state in which the small-diameter portion of the cable cap is disposed inside of the cutout groove; and the engaging recess should be recessed with respect to an abutment surface of the bracket, against which the large-diameter portion on the outer tube side abuts. With this configuration, since the axial length of the cutout groove is slightly less than the length of the small-diameter portion, the cable cap of the control cable can be disposed in the cutout groove in such a manner that the large-diameter portion on the outer tube side and the large-diameter portion on the tip side substantially tightly abut against the abutment surface of the bracket in the axial direction. In this manner, the cable cap can be fixed to the bracket with no axial play without additionally disposing a dedicated fixing component part. Moreover, since the engaging recess is formed with respect to the abutment surface of the bracket, at the time of incorporation, no work for fitting the large-diameter portion on the outer tube side to the engaging recess is required, thus facilitating the fixing of the cable cap to the bracket.

It is preferable that the engaging recess should include an allowing space for allowing the cable cap to be inclined with respect to the bracket and an engaging face located above the edge portion of the outer peripheral surface of the large-diameter portion on the outer tube side that is inclined to intrude into the allowing portion. With this configuration, in the case where the control cable is pulled in the withdrawal direction from the cutout groove by the operating force from the outside, the cable cap is inclined to intrude into the allowing portion, to be then engaged with the engaging face of the engaging recess with certainty. Consequently, the cable cap can be securely inhibited from being drawn from the cutout groove.

It is preferable that the engaging recess should be annularly formed outside in the radial direction of the abutment surface of the bracket on the axis of the cable cap at the abutment position, and the engaging face is formed on the inner wall on the outer periphery of the engaging recess. With this configuration, even in the case where the control cable is pulled in a slightly slantwise direction with respect to the withdrawal direction of the cutout groove, the large-diameter portion on the outer tube side can be engaged with the engaging face of the engaging recess. Consequently, the cable cap can be securely inhibited from being drawn from the cutout groove.

According to the present invention, in the case where the control cable is pulled in the withdrawal direction of the cutout groove, the cable cap engaged with the engaging projection is elastically deformed in such a manner that the upper portion of the large-diameter portion on the outer tube side is brought into press-contact with the bracket. Further, the lower portion is separated from the bracket. Then, the edge portion of the outer peripheral surface of the large-diameter portion on the outer tube side can be engaged with the engaging recess before the small-diameter portion of the cable cap passes upward between the engaging projection and the inner wall facing the engaging projection. Consequently, in the case where the control cable is pulled in the withdrawal direction from the cutout groove by the operating force from the outside, the control cable can be inhibited from being drawn from the cutout groove. The cable cap connected to the terminal of the outer tube can be securely fixed to the bracket with the simple configuration without additionally disposing a dedicated fixing component part. Thus, the control cable can be inhibited from being detached from the bracket.

BRIEF DESCRIPTION OF THE DRAWINGS

FIGS. 3A and 3B are views showing a bracket, wherein FIG. 3A is a front view of the bracket and FIG. 3B is a side cross-sectional view of the bracket;

FIG. 4A is a view showing the control cable incorporated in the terminal fixing device according to the present invention and FIG. 4B is a diagram illustrating the position of a small-diameter portion of a cable cap fixed in a cutout groove formed at the bracket;

FIGS. 5A and 5B are a view showing the control cable pulled in a direction in which it is drawn from the cutout groove.

DETAILED DESCRIPTION OF THE PREFERRED EMBODIMENTS

A detailed description will be given below of a preferred embodiment according to the present invention with reference to the attached drawings.

Figure 1:
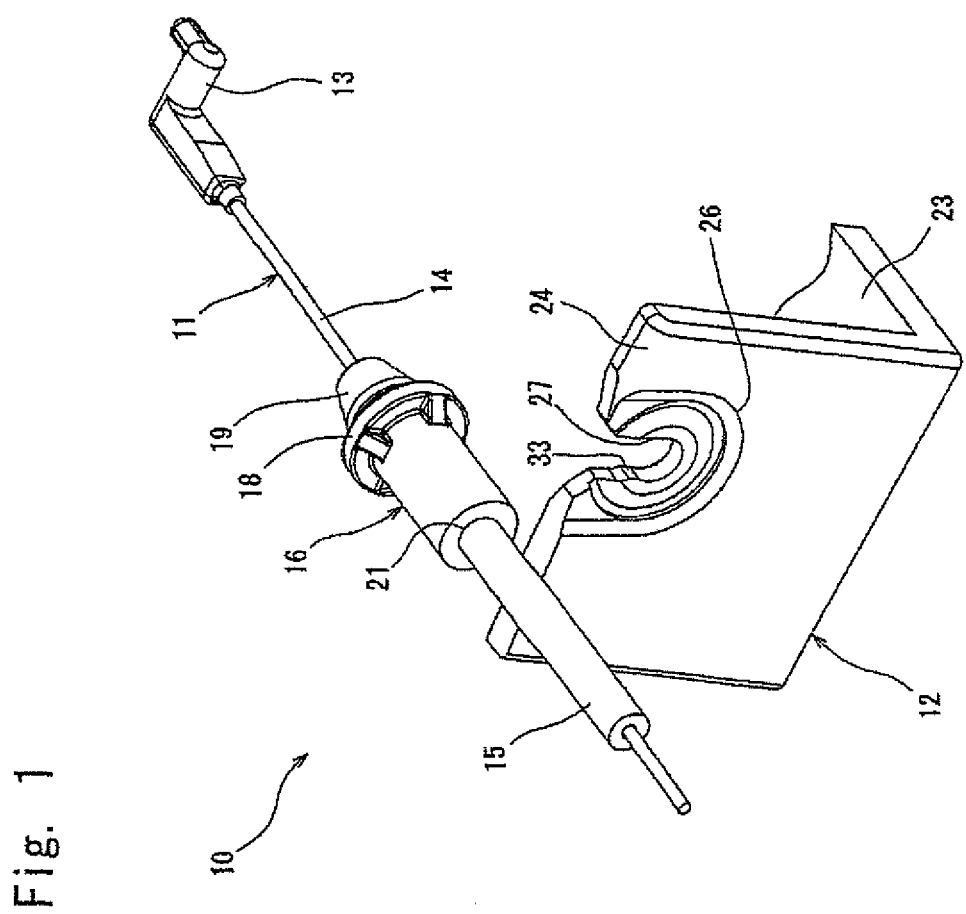
FIG. 1 is a view showing a terminal fixing device for a control cable according to the present invention.

A terminal fixing device 10 for a control cable according to the present invention is provided with a control cable 11 and a bracket 12 for fixing the control cable 11, as shown in FIG. 1.

The control cable 11 includes an inner cable 14 that is connected to an operating member, not shown, such as an inner handle for a vehicle or a member to be operated, not shown, such as an operating lever of a door lock for the vehicle, with a connecting member 13; an outer tube 15, into which the inner cable 14 can be slidably inserted; and a cable cap 16 connected to the end of the outer tube 15.

Figure 2:
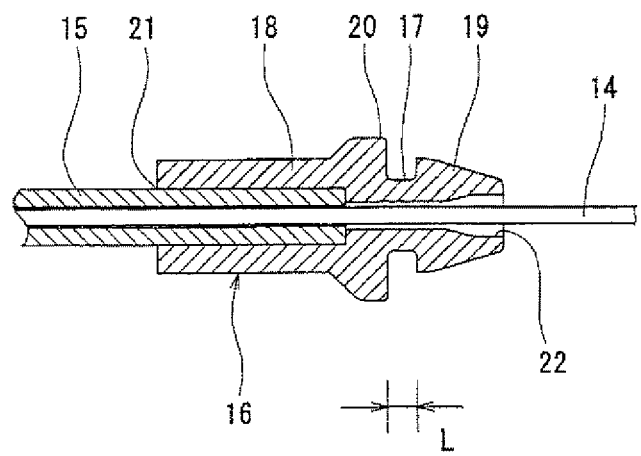
FIG. 2 is a cross-sectional view showing the control cable.

The cable cap 16 is made of a substantially cylindrical elastic material. As shown in FIG. 2, the cable cap 16 includes a small-diameter portion 17, a first large-diameter portion 18 on the outer tube side, and a second large-diameter portion 19 on a tip side. The small-diameter portion 17 is inserted into a cutout groove 27 formed in the bracket 12, described later. The axial length of the small-diameter portion 17 is indicated by reference character L. The first large-diameter portion 18 on the outer tube side includes an annular flange adjacent to the outer tube 15 side in the axial direction of the small-diameter portion 17 and a columnar portion extending in the axial direction from the annular flange toward the outer tube 15 side. An edge portion 20 on the outer periphery of the large-diameter portion 18 on the outer tube side is engaged with an engaging face 36 of an engaging recess 34 formed at the bracket 12, described later. The edge portion 20 is located at an area of the outer peripheral surface of the first large-diameter portion 18 on the outer tube side on the small-diameter portion 17 side, and has a larger diameter than those of the other portions. The second large-diameter portion 19 on the tip side is adjacent to the small-diameter portion 17 on the axial tip side, and gradually narrowed toward an end portion. An insertion hole 21 for containing the outer tube 15 therein is formed in the first large-diameter portion 18 on the outer tube side at an end opposite to the small-diameter portion 17. The inner diameter of the insertion hole 21 is substantially equal to the outer diameter of the outer tube 15. The cable cap 16 is formed with a through hole 22 passing from the insertion hole 21 to the outside of the tip in the axial direction. The axis of the through hole 22 matches (is coaxial) with that of the insertion hole 21. The inner cable 14 projecting from the end of the outer tube 15 is slidably inserted into the through hole 22. The inner diameter of the through hole 22 is smaller than that of the insertion hole 21. As shown in FIG. 4A, the cable cap 16 is configured such that the first large-diameter portion 18 on the outer tube side and the second large-diameter portion 19 on the tip side substantially tightly abut against the bracket 12 in the state in which the small-diameter portion 17 is attached to the cutout groove 27, described later.

The bracket 12 includes a base 23 and a vertical thin plate 24 substantially vertically erected from the base 23. As shown in FIG. 3A, a fixing portion 26 for fixing the control cable 11 at an area adjacent to an upper edge 25 is formed at one surface of the vertical plate 24 in a thickness direction. As shown in FIG. 3B, the thickness of the vertical plate 24 at the area at which the fixing portion 26 is formed is smaller than that of the vertical plate 24 at the other areas at which no fixing portion 26 is formed.

The substantially U-shaped cutout groove 27 having an upper end opened is formed in the fixing portion 26. As shown in FIG. 4B, an interval between inner walls 28 and 29 at straight portions of the U shape of the cutout groove 27 is substantially equal to the diameter of the small-diameter portion 17 of the cable cap 16. Moreover, as shown in FIG. 3B, the axial length of the cutout groove 27 (i.e., a length from an abutment surface 31 to another abutment surface 32) is indicated by reference character Z, which is slightly smaller than the length L of the small-diameter portion 17 of the cable cap 16. Guides 30 for guiding the small-diameter portion 17 of the cable cap 16 downward of the cutout groove 27 are formed in the cutout groove 27 on the side of the upper edge 25 of the bracket 12. A lower portion of the small-diameter portion 17 of the cable cap 16 inserted into the cutout groove 27 from above abuts against an arcuate portion defining the bottom of the cutout groove 27. At this abutment position, the cable cap 16 is fixed.

A first abutment surface 31 is formed at the arcuate portion of the cutout groove 27 and the peripheral edge of the fixing portion 26 that is a part of the straight portion continuous to the arcuate portion. Additionally, another (second) abutment surface 32 is formed at the other surface of the vertical plate 24 in the vertical direction. The first abutment surface 31 is a flat surface in abutment against the first large-diameter portion 18 on the outer tube side of the cable cap 16. In contrast, the second abutment surface 32 is a flat surface in abutment against the second large-diameter portion 19 on the tip side of the cable cap 16.

An engaging projection 33 is formed on the inner wall 28 of the cutout groove 27 in such a manner as to project toward the inner wall 29 oppositely to the inner wall 28. Specifically, as shown in FIG. 4B, a distance d between the engaging projection 33 and the inner wall 29 is smaller than a diameter D of the small-diameter portion 17 of the cable cap 16. The distance d is set such that the small-diameter portion 17 of the cable cap 16 can be fitted into the cutout groove 27 from above downward through the engaging projection 33, and further, that the small-diameter portion 17 cannot disengage by itself in an incorporated state. The engaging projection 33 is formed at a position at which the engaging projection 33 is engaged with the upper portion of the small-diameter portion 17 of the cable cap 16, which is fitted into the cutout groove 27.

An engaging recess 34 is formed at the abutment surface 31 of the bracket 12. The engaging recess 34 is formed annularly outward in the radial direction of the abutment surface 31 of the bracket 12 around the axis of the cable cap 16 at the abutment position. As shown in FIG. 3B, the engaging recess 34 includes an allowing space 35 having an inclined surface which allows the cable cap 16 to be inclined with respect to the bracket 12, and includes an engaging face 36 located above the edge portion 20 at the outer peripheral surface of the first large-diameter portion 18 on the outer tube side, when the cable cap 16 is inclined to intrude into the allowing space 35. The engaging face 36 is formed on the inner wall at the outer circumference of the engaging recess 34. A distance X between the engaging face 36 and the outer periphery of the first large-diameter portion 18 on the outer tube side in the incorporated state shown in FIG. 4A is smaller than a distance Y between the lower end of the engaging projection 33 and the maximum diameter portion (i.e., the center) of the small-diameter portion 17 in the horizontal direction, as shown in FIG. 4B.

Explanation will be made on procedures for incorporating the terminal fixing device 10 for the control cable according to the present invention.

When the small-diameter portion 17 of the cable cap 16 for the control cable 11 is inserted into the cutout groove 27 of the bracket 12, the lower portion of the outer peripheral surface of the small-diameter portion 17 is engaged with the engaging projection 33. When the cable cap 16 is further pushed, the small-diameter portion 17 is elastically deformed so as to pass between the engaging projection 33 and the inner wall 29, thus abutting against the bottom of the cutout groove 27. The small-diameter portion 17 is elastically restored and fitted into the cutout groove 27 in the state that the upper portion is engaged with the engaging projection 33. As a result, the cable cap 16 can be inhibited from being moved upward, so that the cable cap 16 can be inhibited from being drawn from the cutout groove 27. Since the axial length Z of the cutout groove 27 is slightly smaller than the length L of the small-diameter portion 17 of the cable cap 16, the cable cap 16 for the control cable 11 can be disposed in the cutout groove 27 such that the first large-diameter portion 18 on the outer tube side and the second large-diameter portion 19 on the tip side abut against the abutment surfaces 31 and 32 of the bracket 12 substantially tightly in the axial direction. Consequently, the cable cap 16 can be fixed with respect to the bracket 12 with no play in the axial direction without additionally disposing a dedicated fixing component part. Thus, the control cable 11 can be securely fixed to the bracket 12.

Figure 6:
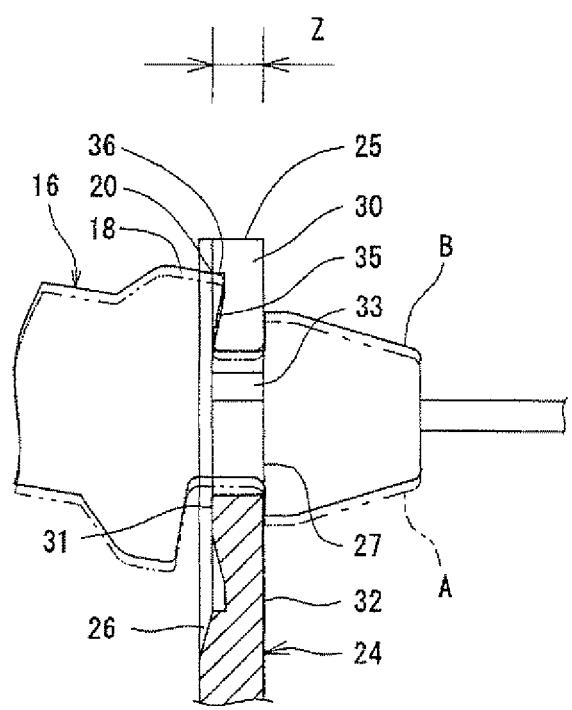
FIG. 6 is a view showing the cable cap engaged with an engaging face of an engaging recess.

In the meantime, when the operating member connected to the control cable 11 is incorporated in a door for a vehicle, the control cable 11 may be accidentally pulled in a direction in which it is drawn from the cutout groove 27. As shown in FIG. 5A, when an operating force in a direction indicated by an arrow is applied to the control cable 11, the cable cap 16 is deformed to be inclined upward around the engaging projection 33 as a fulcrum, and then, the first large-diameter portion 18 on the outer tube side intrudes into the allowing space 35 (indicated by a position A in FIG. 6). When the cable cap 16 is further pulled upward, the small-diameter portion 17 is slightly moved upward. Therefore, the edge portion 20 of the first large-diameter portion 18 on the outer tube side engages with the engaging face 36 of the engaging recess 34 (indicated by a position B in FIGS. 5B and 6). In this manner, the cable cap 16 can be restricted from being moved in a withdrawal direction from the cutout recess 27. Therefore, the control cable 11 can be prevented from being detached from the bracket 12.

According to the present invention, the distance X between the engaging face 36 and the first large-diameter portion 18 on the outer tube side is smaller than the distance Y between the lower end of the engaging projection 33 and the maximum diameter portion (i.e., the center) of the small-diameter portion 17 in the horizontal direction. Therefore, in the case where the control cable 11 is pulled from the cutout recess 27 in the withdrawal direction, the cable cap 16 is elastically deformed in such manner that the upper portion of the large-diameter portion 18 on the outer tube side is brought into press-contact with the bracket 12 whereas the lower portion thereof is separated from the bracket 12. Before the small-diameter portion 17 of the cable cap 16 passes upward between the engaging projection 33 and the inner wall 29 facing the engaging projection 33, the edge portion 20 at the outer peripheral surface of the large-diameter portion 18 on the outer tube side can be engaged with the engaging face 36 of the engaging recess 34. In this manner, in the case where the control cable 11 is pulled in the withdrawal direction from the cutout groove 27 by the operating force from the outside, the control cable 11 can be inhibited from being drawn from the cutout groove 27. Consequently, the cable cap 16 connected to the terminal of the outer tube 15 can be fixed to the bracket 12 with a simple configuration without additionally disposing a dedicated fixing component part. Thus, the control cable 11 can be securely inhibited from being detached from the bracket 12.

Moreover, the engaging recess 34 is recessed with respect to the abutment surface 31 of the bracket 12. Therefore, at the time of the incorporation, it is unnecessary to fit the first large-diameter portion 18 on the outer tube side to the engaging recess 34, thus facilitating the fixing of the cable cap 16 to the bracket 12.

In the case where the control cable 11 is pulled in the withdrawal direction from the cutout groove 27 by the operating force from the outside, the cable cap 16 is inclined to intrude into the allowing space 35, then to be securely engaged with the engaging face 36 of the engaging recess 34.

In this manner, the cable cap 16 can be certainly inhibited from being drawn from the cutout groove 27. Additionally, the engaging recess 34 is annularly formed at the abutment surface 31 of the bracket 12 outside in the radial direction on the axis of the cable cap 16 at the abutment position. Further, the engaging face 36 is formed on the inner wall of the outer periphery of the engaging recess 34. Therefore, even in the case where the control cable 11 is pulled in a slightly slantwise direction with respect to the withdrawal direction from the cutout groove 27, the first large-diameter portion 18 on the outer tube side can be engaged with the engaging face 36 of the engaging recess 34. Thus, the cable cap 16 can be certainly inhibited from being drawn from the cutout groove 27.

The present invention is not limited to the preferred embodiment, and therefore, may be variously modified. For example, the outer tube 15 and the cable cap 16 may be formed integrally with each other.

What is claimed is:

1. A terminal fixing device for a control cable comprising:
    a control cable including:
        an inner cable to be connected to an operating member or a member to be operated;
        an outer tube, said inner cable being slidably inserted into said outer tube; and
        an elastically deformable cable cap fixed to an end of said outer tube, said cable cap having a small-diameter portion, a first large-diameter portion on an outer tube-side of said cable cap, and a second large-diameter portion on a tip-side of said cable cap, said first large-diameter portion and said second large-diameter portion being arranged adjacent to said small-diameter portion on respective opposite sides of said small-diameter portion with respect to an axial direction of said control cable; and
    a bracket including:
        a bottomed cutout groove into which said small-diameter portion of said cable cap is to be inserted from above;
        an engaging projection projecting from a first inner wall of said cutout groove toward a second inner wall opposite said first inner wall, said engaging projection configured to be engaged with an upper portion of said small-diameter portion of said cable cap in an abutment position in which a lower portion of said small-diameter portion of said cable cap abuts against a bottom of said cutout groove; and
        an engaging recess to engage with an edge portion of an outer peripheral surface of said first large-diameter portion of said cable cap when an outer tube-side of said control cable is inclined by an outside operating force about said small-diameter portion with said engaging projection acting as a fulcrum, the outside operating force acting in a direction in which said control cable is withdrawn from said cutout groove of said bracket, said engaging recess being recessed with respect to a plane of an abutment surface of said bracket, said first large-diameter portion of said cable cap to abut against said abutment surface when said small-diameter portion of said cable cap is inserted into said cutout groove;
    wherein said engaging recess has an allowing space having an inclined surface for receiving said cable cap and allowing said cable cap to be inclined with respect to said bracket due to the outside operating force, and said engaging recess has an engaging face located above said edge portion of said outer peripheral surface of said first large-diameter portion when said cable cap is inclined and received within said allowing space; and
    wherein said engaging recess is annularly-shaped and located radially outside of said abutment surface of said bracket with respect to a longitudinal axis of said control cable, said engaging face being formed on an inner wall at an outer periphery of said engaging recess, and said inclined surface of said allowing space being inclined radially outwardly with respect to the longitudinal axis of said control cable.

2. The terminal fixing device of claim 1, wherein an axial length of said cutout groove is less than a length of said small-diameter portion of said cable cap in a direction of the longitudinal axis of said control cable such that said first large-diameter portion and said second large-diameter portion abut against the bracket in the direction of the longitudinal axis of said control cable when said small-diameter portion of said cable cap is inserted into said cutout groove.

3. The terminal fixing device of claim 1, wherein said engaging recess having said allowing space is located radially outside of said engaging projection of said bracket with respect to the longitudinal axis of said control cable.

* * * * *